(12) United States Patent
Yamashita et al.

(10) Patent No.: US 8,837,506 B2
(45) Date of Patent: Sep. 16, 2014

(54) DATA TRANSFER DEVICE

(75) Inventors: Atsuya Yamashita, Tokyo (JP); Tsutomu Mieno, Tokyo (JP); Hiroaki Nakajima, Tokyo (JP); Akira Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 420 days.

(21) Appl. No.: 13/128,736

(22) PCT Filed: Nov. 13, 2009

(86) PCT No.: PCT/JP2009/006066
§ 371 (c)(1),
(2), (4) Date: Jun. 8, 2011

(87) PCT Pub. No.: WO2010/070810
PCT Pub. Date: Jun. 24, 2010

(65) Prior Publication Data
US 2012/0093171 A1    Apr. 19, 2012

(30) Foreign Application Priority Data
Dec. 15, 2008  (JP) .................................. 2008-318149

(51) Int. Cl.
H04L 12/28 (2006.01)
H04L 12/56 (2006.01)
H04L 12/707 (2013.01)
H04L 12/703 (2013.01)
H04L 12/709 (2013.01)
H04L 12/751 (2013.01)
H04L 12/933 (2013.01)
H04L 12/801 (2013.01)
H04L 12/931 (2013.01)
H04L 12/947 (2013.01)

(52) U.S. Cl.
CPC ............... *H04L 49/10* (2013.01); *H04L 45/22* (2013.01); *H04L 45/28* (2013.01); *H04L 49/503* (2013.01); *H04L 49/25* (2013.01); *H04L 45/245* (2013.01); *H04L 45/026* (2013.01); *H04L 47/10* (2013.01); *H04L 47/12* (2013.01)
USPC ........................................................ 370/419

(58) Field of Classification Search
None
See application file for complete search history.

(56) References Cited

U.S. PATENT DOCUMENTS 6,871,241 B2 * 3/2005 Fukae et al. ..................... 710/15
7,710,992 B2 * 5/2010 Shimada ....................... 370/415
(Continued)

FOREIGN PATENT DOCUMENTS

JP    2002232427 A    8/2002
JP    3350120 B2    11/2002
(Continued)

OTHER PUBLICATIONS

Japanese Office Action for JP2008-318149 mailed on Oct. 30, 2012.
(Continued)

*Primary Examiner* — Ayaz Sheikh
*Assistant Examiner* — Blanche Wong
(74) *Attorney, Agent, or Firm* — Sughrue Mion, PLLC

(57) ABSTRACT

A data transfer device 210 is equipped with a plurality of communication ports 211a and 211b, a communication establishment processor 212, and a communication maintenance processor 213. The communication establishment processor 212 transmits and receives communication establishing information for establishing communication with an external device connected via the communication port to and from the external device. The communication maintenance processor 213 is configured to operate independently of the communication establishment processor 212 and, every time a predetermined transmission period elapses, transmits communication maintaining information for maintaining the establishment of communication with the external device, to the external device. In a state that communication with a plurality of external devices via the plurality of communication ports is established, the data transfer device 210 transmits data received from one of the plurality of external devices to the other one of the plurality of external devices.

23 Claims, 6 Drawing Sheets

(56) References Cited

U.S. PATENT DOCUMENTS

| | | | |
|---|---|---|---|
| 7,835,376 B2 * | 11/2010 | Tanaka | 370/401 |
| 2002/0018447 A1 | 2/2002 | Yamada et al. | |
| 2002/0105949 A1 | 8/2002 | Shinomiya | |
| 2002/0181456 A1 | 12/2002 | Katayama et al. | |
| 2007/0127464 A1 | 6/2007 | Jain et al. | |
| 2008/0080556 A1 | 4/2008 | Shimada | |
| 2008/0240133 A1 | 10/2008 | Tanaka | |
| 2009/0245112 A1 * | 10/2009 | Okazaki | 370/236 |
| 2011/0051643 A1 * | 3/2011 | Hans et al. | 370/311 |

FOREIGN PATENT DOCUMENTS

| | | |
|---|---|---|
| JP | 2007043281 A | 2/2007 |
| JP | 4110150 B2 | 7/2008 |
| JP | 2008160227 A | 7/2008 |
| WO | 2006107087 A | 10/2006 |

OTHER PUBLICATIONS

Mick Seaman, "Link Aggregation Control Protocol", IEEE802.org, XP-002719206, Rev.4.0, Mar. 7, 1999, pp. 1-39, [internet] URL: <http://www.ieeee802.org/3/ad/public/mar99/seaman_1_0399.pdf>, [retrieved on Jan. 23, 2014] Cited in EP Search Report.
The Extended European Search Report of EP Application No. 09833120.0 dated Feb. 5, 2014.
International Search Report for PCT Application No. PCT/JP2009/006066 mailed on Dec. 15, 2009.
Chinese Office Action for CN Application No. 200980150287.3, issued on Sep. 4, 2013 with English Translation.

* cited by examiner

FIG. 2

| DESTINATION ADDRESS (01-80-c2-00-00-02) | SOURCE ADDRESS | TYPE (0×8809) | SUBTYPE(0×01) | VERSION(0×01) | TLV TUPLE (Actor) | TLV TUPLE (Partner) | TLV TUPLE (Collector) | TLV TUPLE (terminator) | Reserved(0) | FCS |

DATA TRANSFER DEVICE

The present invention is the National Phase of PCT/JP2009/006066, filed Nov. 13, 2009, which is based upon and claims the benefit of priority from Japanese patent application No. 2008-318149, filed on Dec. 15, 2008, the disclosure of which is incorporated herein in its entirety by reference.

TECHNICAL FIELD

The present invention relates to a data transfer device that transfers data received from one external device to another external device.

BACKGROUND ART

A data transfer device that transfers data (e.g., a frame) received from one external device to another external device is known. A data transfer device described in Patent Document 1 as one of data transfer devices of this type is equipped with a communication establishment processor.

The communication establishment processor transfers and receives communication establishing information for establishing communication with an external device connected via a communication port, to and from the external device. Moreover the communication establishment processor transmits communication maintaining information for maintaining the establishment of communication with an external device to the external device every time a predetermined transmission period elapses.

Thus, communication between the data transfer device and the external device is established, and the establishment of the communication can be maintained.

[Patent Document 1] Japanese Unexamined Patent Application Publication No. JP-A 2008-160227

There is a case that, in the data transfer device described above, an operation of the communication establishment processor must be stopped (e.g., when a firmware program is updated in a case that the communication establishment processor is configured by a CPU that executes the firmware program, or when failure occurs in the communication establishment processor).

In this case, the data transfer device cannot transmit communication maintaining information. Therefore, in such a case, there is a problem that it is impossible to maintain the establishment of communication with an external device.

SUMMARY

Accordingly, an object of the present invention is to provide a data transfer device capable of solving the aforementioned problem, "in a case that an operation of the communication establishment processor has stopped, it is impossible to maintain the establishment of communication with an external device."

In order to achieve the object, a data transfer device of an embodiment of the present invention is equipped with: a plurality of communication ports; a communication establishment processor configured to transmit and receive communication establishing information for establishing communication with an external device connected via the communication port to and from the external device; and a communication maintenance processor configured to operate independently of the communication establishment processor, and transmit communication maintaining information for maintaining establishment of the communication with the external device, to the external device, every time a predetermined transmission period elapses The data transfer device is configured to, in a state that communication with each of a plurality of external devices via the plurality of communication ports is established, transmit data received from one of the plurality of external devices to the other one of the plurality of external devices.

Further, a communication maintenance processing circuit of another embodiment of the present invention is configured to, in a case that the communication maintenance processing circuit is applied to a data transfer device, which is equipped with a plurality of communication ports and a communication establishment processor configured to transmit and receive communication establishing information for establishing communication with an external device connected via the communication port to and from the external device, and which is configured to, in a state that communication with each of a plurality of external devices via the plurality of communication ports is established, transmit data received from one of the plurality of external devices to the other one of the plurality of external devices:

operate independently of the communication establishment processor; and transmit communication maintaining information for maintaining establishment of communication with the external device to the external device every time a predetermined transmission period elapses.

Further, a data transfer system of another embodiment of the present invention is a system includes a data transfer device and a plurality of external devices.

Furthermore, the data transfer device is equipped with: a plurality of communication ports; a communication establishment processor configured to transmit and receive communication establishing information for establishing communication with the external device connected via the communication port to and from the external device; and a communication maintenance processor configured to operate independently of the communication establishment processor, and transmit communication maintaining information for maintaining establishment of communication with the external device to the external device every time a predetermined transmission period elapses. The data transfer device is configured to, in a state that communication with each of the plurality of external devices via the plurality of communication ports is established, transmit data received from one of the plurality of external devices to the other one of the plurality of external devices.

Furthermore, the external device is configured to transmit and receive the communication establishing information to and from the data transfer device. The external device is configured to maintain establishment of communication with the data transfer device in a case that a predetermined standby time has not elapsed since a latest reception time point that is a latest time point of reception of the communication maintaining information from the data transfer device, whereas cancel the establishment of the communication with the data transfer device in a case that the standby time has elapsed since the latest reception time point.

Further, a data transfer method of another embodiment of the present invention is a method including: transmitting and receiving communication establishing information for establishing communication with an external device connected via a communication port to and from the external device, by a communication establishment processor; transmitting communication maintaining information for maintaining establishment of communication with the external device to the external device every time a predetermined transmission period elapses, by a communication maintenance processor configured to operate independently of the communication establishment processor; and, in a state that communication with each of a plurality of external devices via a plurality of communication ports is established, transmitting data received from one of the plurality of external devices to the other one of the plurality of external devices.

Further, a communication maintenance processing program of another embodiment of the present invention is a computer program for causing a processing device to realize a communication maintenance processing means. The processing device is configured to operate independently of a communication establishment processor in a case that the communication maintenance processing program is applied to a data transfer device. The data transfer device is equipped with a plurality of communication ports and the communication establishment processor that is configured to transmit and receive communication establishing information for establishing communication with an external device connected via the communication port to and from the external device, and is configured to, in a state that communication with each of a plurality of external devices via the plurality of communication ports is established, transmit data received from one of the plurality of external devices to the other one of the plurality of external devices. The communication maintenance processing means is configured to transmit communication maintaining information for maintaining establishment of communication with the external device to the external device every time a predetermined transmission period elapses.

With the configurations as described above, the present invention can maintain the establishment of communication with an external device even if an operation of the communication establishment processor has stopped.

BRIEF DESCRIPTION OF DRAWINGS

FIG. 2 is an explanation view conceptually showing an LACP frame transmitted as communication maintaining information;

EXEMPLARY EMBODIMENT

Below, the respective exemplary embodiments of a data transfer device, a communication maintenance processing circuit, a data transfer system, a data transfer method and a communication maintenance processing program according to the present invention will be described with reference to FIGS. 1 to 6.

First Exemplary Embodiment (Configuration)

Figure 1:
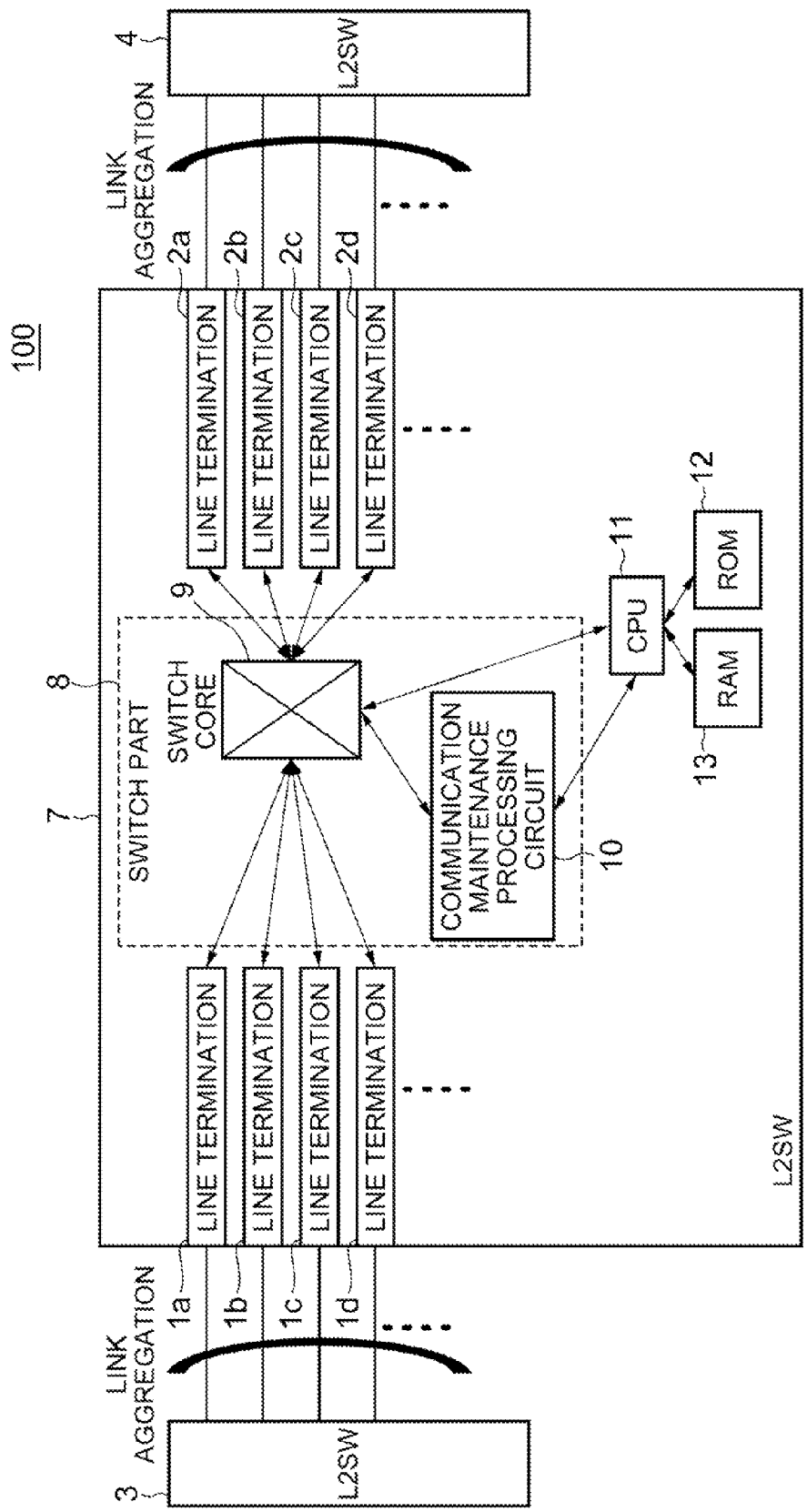
FIG. 1 is a diagram showing a schematic configuration of a data transfer system according to an exemplary embodiment of the present invention.

As shown in FIG. 1, a data transfer system 100 according to a first exemplary embodiment of the present invention includes a plurality of (in this exemplary embodiment, three) layer 2 switches (L2SWs) 3, 4 and 7. In this specification, the L2SW 3 is also referred to as a data transfer device. Moreover, the L2SWs 4 and 7 are also referred to as external devices.

Each of the L2SWs 3, 4 and 7 is a device that transmits and receives data in accordance with a protocol of a data link layer (Layer 2) in the OSI (Open Systems Interconnection) reference model.

In this exemplary embodiment, configurations of the respective L2SWs 3, 4 and 7 are similar to one another. Therefore, only the configuration of the L2SW 7 will be described below.

The L2SW 7 is equipped with a switch part 8, a plurality of communication ports (line terminations) 1a, 1b, 1c, 1d, 2a, 2b, 2c and 2d (communication ports 1a to 2d), a central processing unit (CPU) 11, a random access memory (RAM) 13 that configures part of a storing device, and a read only memory (ROM) 12 that configures part of the storing device. The CPU 11, the ROM 12 and the RAM 13 configure a communication establishment processor.

The L2SW 7 is connected with the L2SW 3 via the plurality of communication ports 1a to 1d. In a like manner, the L2SW 7 is connected with the L2SW 4 via the plurality of communication ports 2a to 2d.

The L2SW 7 performs link aggregation that is transmission and reception of data to and from the L2SW 3 via the plurality of communication ports 1a to 1d. That is to say, communication between the L2SW 7 and the L2SW 3 is performed by using one logical channel formed by bundling the plurality of communication ports 1a to 1d.

In a like manner, the L2SW 7 performs link aggregation that is transmission and reception of data to and from the L2SW 4 via the plurality of communication ports 2a to 2d. That is to say, communication between the L2SW 7 and the L2SW 4 is performed by using one logical channel formed by bundling the plurality of communication ports 2a to 2d.

The switch part 8 includes a switch core 9, and a communication maintenance processing circuit (a communication maintenance processor, a communication maintenance processing means) 10.

The switch core 9 has a function of switching an Ethernet™ frame. To be specific, in a state that communication with each of a plurality of external devices (in this exemplary embodiment, the L2SW 3 and the L2SW 4) via the plurality of communication ports 1a to 2d is established, the switch core 9 transmits data received from one (e.g., the L2SW 3) of the plurality of external devices to the other (e.g., the L2SW 4) of the plurality of external devices.

Upon reception of communication establishing information for establishing communication with the L2SW 3, 4 connected via the communication ports 1a to 2d from the L2SW 3, 4, the switch core 9 outputs the received communication establishing information to the CPU 11.

Communication establishing information is information according to the LACP (Link Aggregation Control Protocol) (an LACP frame).

Further, in response to an instruction signal from the CPU 11, the switch core 9 transmits communication establishing information to the L2SW 3, 4 via the communication port 1a to 2d instructed by the CPU 11. Moreover, in response to an instruction signal from the communication maintenance processing circuit, the switch core 9 transmits communication maintaining information to the L2SW 3, 4 via the communication port 1a to 2d instructed by the communication maintenance processing circuit 10.

Communication maintaining information is information for maintaining the establishment of the communication with the L2SW 3, 4. Communication maintaining information is information according to the LACP (an LACP frame).

As shown in FIG. 2, communication maintaining information includes a TLV (Type-Length-Value) tuple as Actor information, and a TLV tuple as Partner information. Actor information is information representing a state of a device itself. Partner information is information representing a state of a communication destination device.

In a data transfer system according to the LACP, two devices exchanges Actor information and Partner information with each other, thereby being capable of maintaining the establishment of communication between the devices.

In the ROM 12, a firmware program is stored. The CPU 11 executes the firmware program stored in the ROM 12 by using the RAM 13, thereby controlling the L2SW 7 in the following manner.

The CPU 11 outputs an instruction signal to the switch core 9, thereby transmitting and receiving communication establishing information to and from the L2SW 3, 4 via each of the communication ports 1a to 2d.

Furthermore, for each of the communication ports 1a to 2d, the CPU 11 determines whether or not a predetermined standby time has elapsed since a latest reception time point, which is the latest time point of reception of communication maintaining information from the L2SW 3 (or the L2SW 4) via the switch core 9 (i.e., whether or not communication maintaining information has not been received again until the standby time elapses since reception of communication maintaining information once). In this exemplary embodiment, the standby time is 3.5 times a transmission period described later. The standby time may be set to any time as far as longer than the transmission period.

Then, for each of the communication ports 1a to 2d, in the case of determining that the standby time has not elapsed since the newest reception time point, the CPU 11 controls the L2SW 7 so as to maintain the establishment of the communication with the L2SW 3 (or the L2SW 4). On the other hand, for each of the communication ports 1a to 2d, in the case of determining that the standby time has elapsed since the latest reception time point, the CPU 11 controls the L2SW 3 (or the L2SW 4) so as to cancel the establishment of the communication with the L2SW 3 (or the L2SW 4) (specifically, so as not to use the communication port).

The communication maintenance processing circuit 10 is configured to operate independently of the communication establishment processor (the CPU 11, the ROM 12, and the RAM 13). That is to say, the communication maintenance processing circuit 10 is configured to operate (specifically, output an instruction signal) even when an operation of the communication establishment processor is stopped.

The communication maintenance processing circuit 10 includes a storing device (in this exemplary embodiment, a nonvolatile memory) as a transmission instruction information storing part, which is not shown in the drawings.

In the transmission instruction information storing part, transmission instruction information for each of the plurality of communication ports 1a to 2d is stored. Transmission instruction information includes communication maintaining information, communication port specification information for specifying the communication port 1a to 2d used for transmitting the communication maintaining information, and transmission period information representing a transmission period (one second, thirty seconds, etc.). For example, the transmission period is defined as one second or thirty seconds in the IEEE (the Institute of Electrical and Electronics Engineers, Inc.) 802.3.

Communication maintaining information is information according to the LACP (i.e., an LACP frame). Communication maintaining information is also referred to as a PDU (Protocol Data Unit) in the LACP.

The communication maintenance processing circuit 10 outputs an instruction signal to the switch core 9 and, every time the transmission period represented by the transmission period information included in the transmission instruction information stored in the transmission instruction information storing part elapses, transmits communication maintaining information included in the transmission instruction information to an external device (in this exemplary embodiment, the L2SW 3 or the L2SW 4) via a communication port specified by the communication port specification information included in the transmission instruction information.

(Operation)

Next, an operation of the data transfer system 100 configured as described above will be described with reference to FIGS. 2 to 5. Although the operation of the data transfer system 100 for one communication port 1a will be described below, the operation of the data transfer system 100 for the other communication ports 1b to 2d can be described in a like manner.

Figure 3:
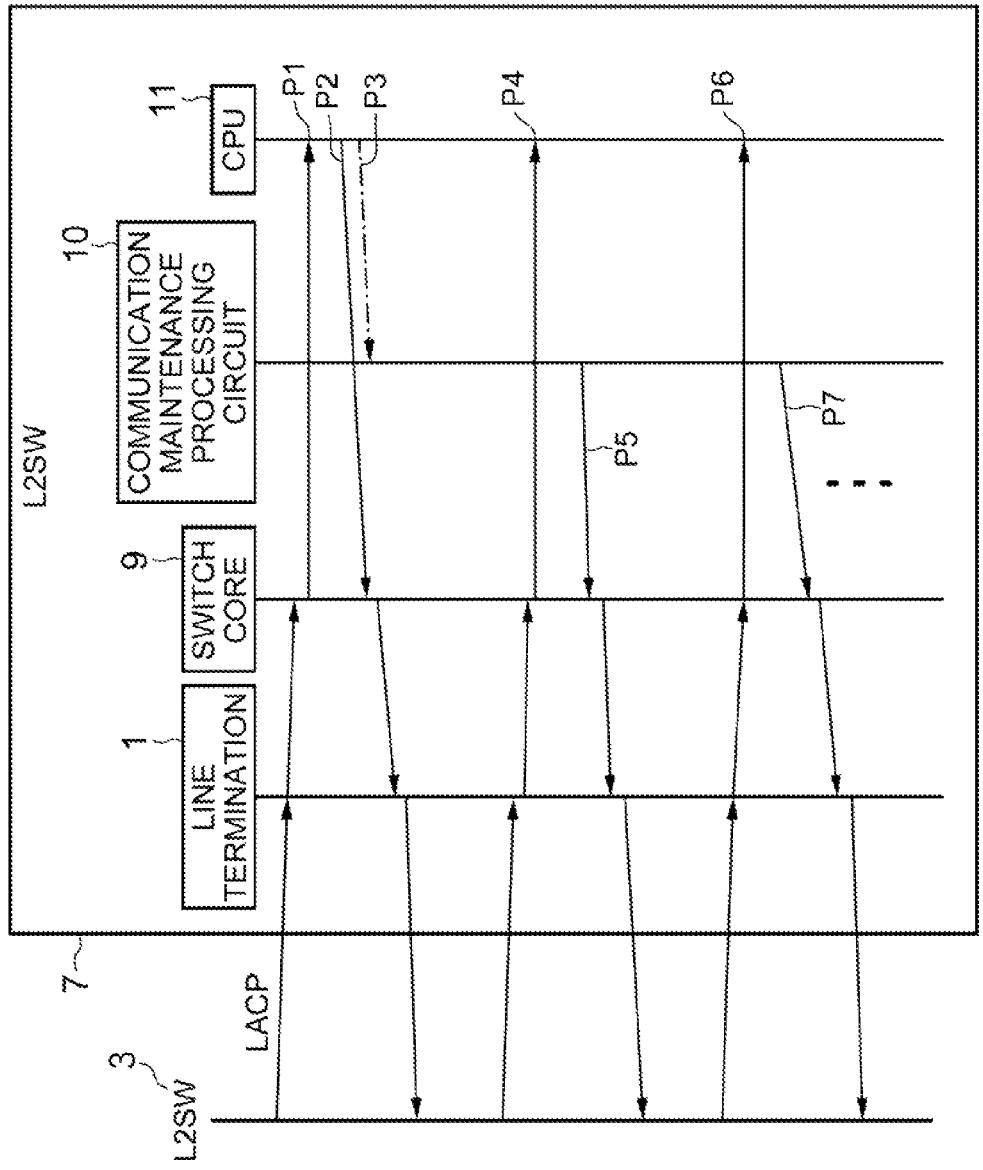
FIG. 3 is a sequence diagram showing an operation of the data transfer system when communication between two L2SWs is established.

As shown in FIG. 3, the CPU 11 of the L2SW 7 receives communication establishing information transmitted by the L2SW 3 (step P1; part of a communication establishment processing step). Then, the CPU 11 of the L2SW 7 transmits communication establishing information to the L2SW 3 (step P2; part of the communication establishment processing step). Consequently, communication between the L2SW 3 and the L2SW 7 is established.

Next, the CPU 11 of the L2SW 7 causes the transmission instruction information storing part of the communication maintenance processing circuit 10 to store transmission instruction information (step P3; a transmission instruction information storing processing step). The transmission instruction information includes the abovementioned communication establishing information as communication maintaining information, communication port specification information for specifying the communication port 1a used for transmitting the communication maintaining information, and transmission period information representing a transmission period (in this exemplary embodiment, one second).

After that, the CPU 11 receives communication establishing information transmitted by the L2SW 3 (step P4). Then, when the abovementioned transmission period elapses since a time point that the transmission instruction information is stored into the transmission instruction information storing part, the communication maintenance processing circuit 10 transmits the communication maintaining information included in the transmission instruction information stored in the transmission instruction information storing part to the L2SW 3 via the communication port 1a specified by the communication port specification information included in the transmission instruction information (step P5; a communication maintenance processing step).

After that, the CPU 11 receives communication establishing information transmitted by the L2SW 3 (step P6). Then, when the transmission period represented by the transmission period information included in the transmission instruction information stored in the transmission instruction information storing part elapses since the latest time point of transmission of communication maintaining information, the communication maintenance processing circuit 10 transmits communication maintaining information included in the transmission instruction information to the L2SW 3 via the communication port 1a specified by communication port specification information included in the transmission instruction information (step P7; the communication maintenance processing step).

After that, the data transfer system 100 operates in a like manner as at step P6 and step P7.

Thus, the establishment of communication between the L2SW 3 and the L2SW 7 via the communication port 1a is maintained.

In the case of determining that communication maintaining information received from the L2SW 3 is different from communication maintaining information received last time, the CPU 11 causes the transmission instruction information storing part of the communication maintenance processing circuit 10 to store transmission instruction information based on the communication maintaining information received this time.

Moreover, in a case that the state of the L2SW 7 has changed, the CPU 11 also causes the transmission instruction information storing part of the communication maintaining processing circuit 10 to store transmission instruction information based on the latest state.

Thus, in a case that communication maintaining information to be transmitted for maintaining the establishment of communication has changed, the CPU 11 generates transmission instruction information and causes the transmission instruction information storing part of the communication maintenance processing circuit 10 to store the generated transmission instruction information.

In addition, every time a predetermined transmission instruction update period elapses, the CPU 11 generates transmission instruction information and causes the transmission instruction information storing part of the communication maintenance processing circuit 10 to store the generated transmission instruction information.

Consequently, it is possible to securely update transmission instruction information every time the transmission instruction update period elapses. As a result, it is possible to securely maintain the establishment of communication with the L2SW 3, 4 (an external device).

Figure 4:
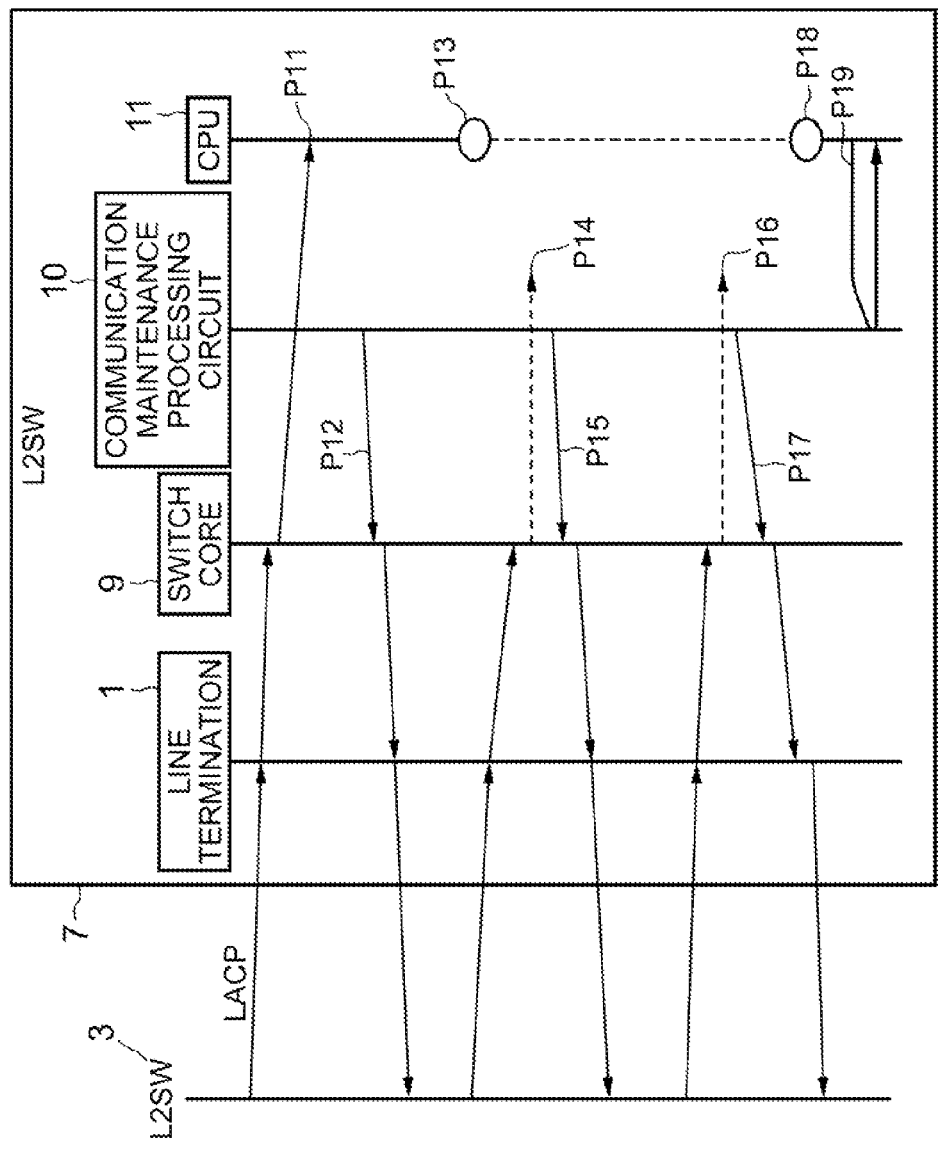
FIG. 4 is a sequence diagram showing an operation of the data transfer system when a CPU stops an operation.

An operation of the data transfer system 100 when an operation of the CPU 11 is stopped to update the firmware program stored in the ROM 12 after that will be described with reference to FIG. 4.

In a case that the CPU 11 stops an operation at step P13, the CPU 11 cannot receive communication maintaining information transmitted by the L2SW 3. That is to say, this communication transmitting information is discarded (step P14 and step P16).

On the other hand, while the CPU 11 stops the operation, the communication maintenance processing circuit 10 also transmits communication maintaining information to the L2SW 3 every time a transmission period elapses (step P15 and step P17). Consequently, it is possible to maintain the establishment of communication between the L2SW 3 and the L2SW 7 via the communication port 1a. That is to say, it is possible to avoid occurrence of a timeout of the LACP.

After that, when the update of the firmware program stored in the ROM 12 is completed, the CPU 11 restarts the operation (step P18).

At this time point, information stored in the RAM 13 before the CPU 11 stops the operation has been erased.

Thus, when starting the operation, the CPU 11 retrieves (acquires) transmission instruction information stored in the transmission instruction information storing part of the communication maintenance processing circuit 10 (step P19). Then, the CPU 11 causes the RAM 13 to store the retrieved transmission instruction information.

Consequently, in a case that the CPU 11 restarts the operation after stopping, the CPU 11 can execute a process for changing a state of communication with the L2SW 3, 4 or a process for maintaining the establishment of communication with the L2SW 3, 4, based on the latest transmission instruction information (i.e., the latest communication state).

Figure 5:
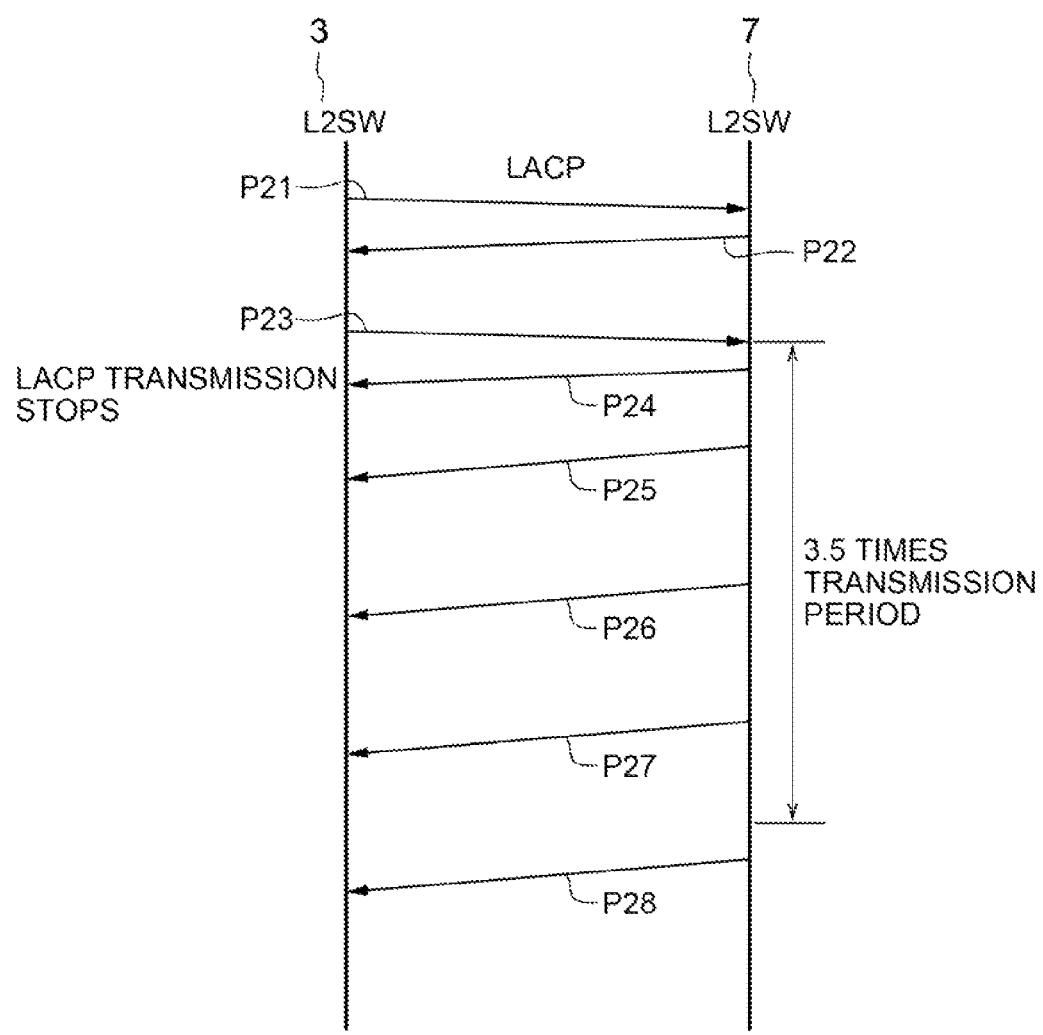
FIG. 5 is a sequence diagram showing an operation of the data transfer system when transmission of communication maintaining information from an L2SW with which communication has been established is stopped.

Further, an operation of the data transfer system 100 in a case that the L2SW 3 has been unable to transmit communication maintaining information to the L2SW 7 since a certain time point will be described with reference to FIG. 5.

Assuming the L2SW 3 has been unable to transmit communication maintaining information to the L2SW 7 since step P23, the description will be continued.

In this case, at a time point (a time point between step P27 and step P28) that a standby time has elapsed since a latest reception time point (a time point of step P23), which is the latest time point of reception of communication maintaining information from the L2SW 3, the CPU 11 of the L2SW 7 controls the L2SW 7 so as to cancel the establishment of communication with the L2SW 3 (specifically, so as not to use the communication port 1a for communication). That is to say, the L2SW 7 deletes the communication port 1a from the link aggregation structured by using the LACP.

As described above, according to the first exemplary embodiment of the data transfer system of the present invention, even if an operation of the CPU 11 (the communication establishment processor) stops, the communication maintenance processing circuit 10 (the communication maintenance processor) can transmit communication maintaining information. As a result, it is possible to maintain the establishment of communication with the L2SW 3, 4 (an external device).

Furthermore, in the first exemplary embodiment, the transmission instruction information storing part stores transmission instruction information for each of the plurality of communication ports 1a to 2d.

Thus, it is possible to transmit different communication maintaining information for each of the communication ports 1a to 2d.

In addition, in the first exemplary embodiment, transmission instruction information includes transmission period information representing a transmission period, and the communication maintenance processing circuit 10 (the communication maintenance processor) transmits communication maintaining information every time a transmission period represented by transmission period information included in transmission instruction information stored in the transmission instruction information storing part elapses.

Consequently, in a case that a standby time during which the establishment of communication can be maintained even if the L2SW 3, 4 (an external device) does not receive communication maintaining information is set to any time (e.g., one second, thirty seconds, etc.), it is also possible to securely maintain the establishment of the communication with the L2SW 3, 4 (the external device).

Second Exemplary Embodiment

Figure 6:
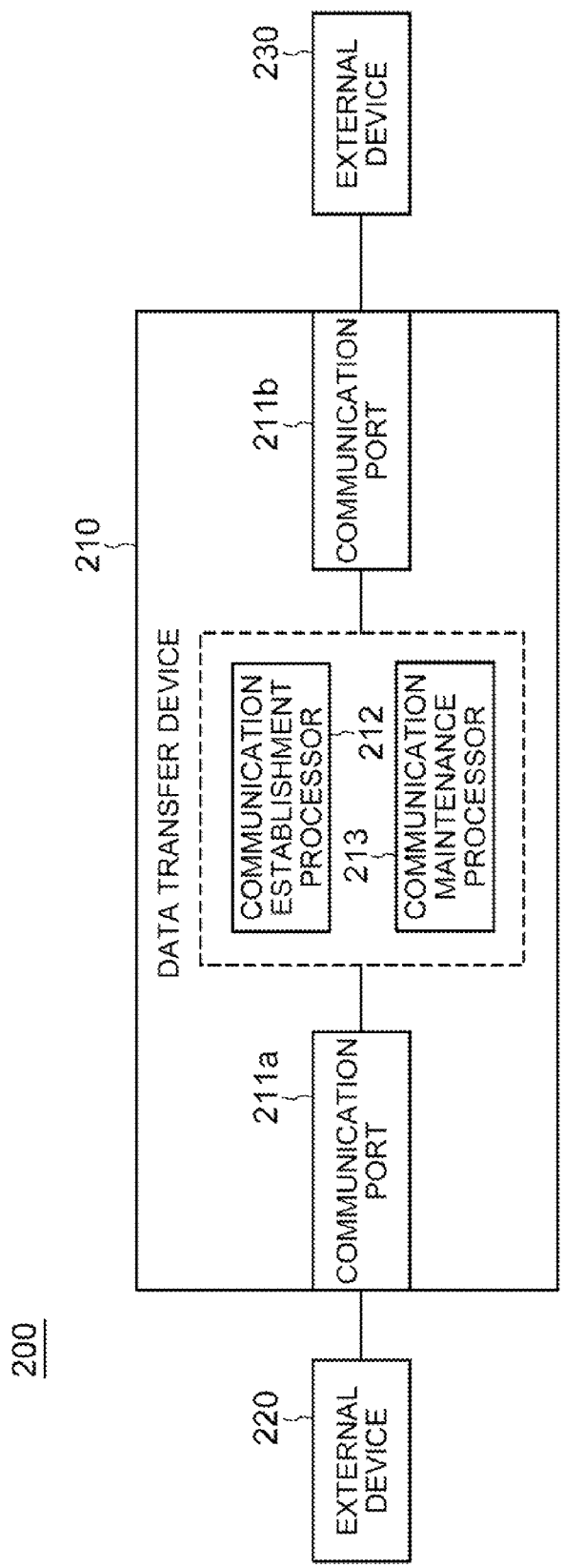
FIG. 6 is a diagram showing a schematic configuration of a data transfer system according to a second exemplary embodiment of the present invention.

Next, a data transfer system according to a second exemplary embodiment of the present invention will be described with reference to FIG. 6.

A data transfer system 200 according to the second exemplary embodiment includes a data transfer device 210, and a plurality of external devices 220 and 230.

The data transfer device 210 is equipped with a plurality of communication ports 211a and 211b, a communication establishment processor 212, and a communication maintenance processor 213.

The data transfer device 210 and the external device 220 are connected via the communication port 211a. Moreover, the data transfer device 210 and the external device 230 are connected via the communication port 211b.

The communication establishment processor 212 transmits and receives communication establishing information for establishing communication with the external device 220 to and from the external device 220. In a like manner, the communication establishment processor 212 transmits and receives communication establishing information for establishing communication with the external device 230 to and from the external device 230.

The communication maintenance processor 213 is configured to operate independently of the communication establishment processor 212.

Every time a predetermined transmission period elapses, the communication maintenance processor 213 transmits communication maintaining information for maintaining the establishment of communication with the external device 220, to the external device 220. In a like manner, every time a predetermined transmission period elapses, the communication maintenance processor 213 transmits communication maintaining information for maintaining the establishment of communication with the external device 230, to the external device 230.

In a state that communication with each of the plurality of external devices 220 and 230 via the plurality of communication ports 211a and 211b is established, the data transfer device 210 transmits data received from one (e.g., the external device 220) of the plurality of external devices to the other (e.g., the external device 230) of the plurality of external devices.

According to the second exemplary embodiment, the communication maintenance processor 213 also can transmit communication maintaining information in a case that an operation of the communication establishment processor 212 stops. As a result, it is possible to maintain the establishment of communication with the external device 220, 230.

In this case, it is preferred that: the communication maintenance processor includes a transmission instruction information storing part configured to store transmission instruction information, which includes the communication maintaining information and communication port specification information for specifying the communication port used for transmitting the communication maintaining information; and the communication maintenance processor is configured to transmit the communication maintaining information included in the stored transmission instruction information to the external device via the communication port specified by the communication port specification information included in the transmission instruction information.

In this case, it is preferred that the transmission instruction information storing part is configured to store the transmission instruction information for each of the plurality of communication ports.

According to this, it is possible to transmit different communication maintaining information for each communication port.

In this case, it is preferred that: the transmission instruction information includes transmission period information representing the transmission period; and the communication maintenance processor is configured to transmit the communication maintaining information every time the transmission period represented by the transmission period information included in the stored transmission instruction information elapses.

According to this, in a case that a standby time during which the establishment of communication can be maintained even if an external device does not receive communication maintaining information is set to any time (e.g., one second, thirty seconds, etc.,), it is also possible to securely maintain the establishment of the communication with the external device.

In this case, it is preferred that the communication establishment processor is configured to generate the transmission instruction information based on the communication establishing information and cause the transmission instruction information storing part to store the generated transmission instruction information.

In this case, it is preferred that the communication establishment processor is configured to, every time a predetermined transmission instruction update period elapses, generate the transmission instruction information and cause the transmission instruction information storing part to store the generated transmission instruction information.

According to this, it is possible to securely update transmission instruction information every time a transmission instruction update period elapses. As a result, it is possible to securely maintain the establishment of communication with an external device.

In this case, it is preferred that the communication establishment processor is configured to, in a case that communication maintaining information to be transmitted for maintaining the establishment of the communication has changed, generate the transmission instruction information and cause the transmission instruction information storing part to store the generated transmission instruction information.

According to this, it is possible to securely update transmission instruction information in a case that communication maintaining information to be transmitted for maintaining the establishment of communication has changed. As a result, it is possible to securely maintain the establishment of communication with an external device.

In this case, it is preferred that the communication establishment processor is configured to acquire the transmission instruction information stored in the transmission instruction information storing part when the communication establishment processor starts an operation.

According to this, in a case that the communication establishment processor restarts an operation after stopping, the communication establishment processor can execute a process for changing a state of communication with an external device or a process for maintaining the establishment of communication with an external device, based on the latest transmission instruction information.

In this case, it is preferred that the data transfer device is configured to perform link aggregation, which is transmission and reception of data to and from one external device via the plurality of communication ports.

In this case, it is preferred that the data transfer device is configured to transmit and receive the data in accordance with a protocol of a data link layer in OSI (Open Systems Interconnection) reference model.

Further, a communication maintenance processing circuit of another exemplary embodiment of the present invention is configured to, in a case that the communication maintenance processing circuit is applied to a data transfer device, which is equipped with a plurality of communication ports and a communication establishment processor configured to transmit and receive communication establishing information for establishing communication with an external device connected via the communication port to and from the external device, and which is configured to, in a state that communication with each of a plurality of external devices via the plurality of communication ports is established, transmit data received from one of the plurality of external devices to the other one of the plurality of external devices:

operate independently of the communication establishment processor; and transmit communication maintaining information for maintaining establishment of communication with the external device to the external device every time a predetermined transmission period elapses.

In this case, it is preferred that: the communication maintenance processing circuit includes a transmission instruction information storing part configured to store transmission instruction information, which includes the communication maintaining information and communication port specification information for specifying the communication port used for transmitting the communication maintaining information; and the communication maintenance processing circuit is configured to transmit the communication maintaining information included in the stored transmission instruction information to the external device via the communication port specified by the communication port specification information included in the transmission instruction information.

In this case, it is preferred that the transmission instruction information storing part is configured to store the transmission instruction information for each of the plurality of communication ports.

In this case, it is preferred that: the transmission instruction information includes transmission period information representing the transmission period; and the communication maintenance processing circuit is configured to transmit the communication maintaining information every time the transmission period represented by the transmission period information included in the stored transmission instruction information elapses.

Further, a data transfer system of another exemplary embodiment of the present invention is a system including a data transfer device and a plurality of external devices.

Furthermore, the data transfer device is equipped with: a plurality of communication ports; a communication establishment processor configured to transmit and receive communication establishing information for establishing communication with the external device connected via the communication port to and from the external device; and a communication maintenance processor configured to operate independently of the communication establishment processor, and transmit communication maintaining information for maintaining establishment of communication with the external device to the external device every time a predetermined transmission period elapses. The data transfer device is configured to, in a state that communication with each of the plurality of external devices via the plurality of communication ports is established, transmit data received from one of the plurality of external devices to the other one of the plurality of external devices.

Furthermore, the external device is configured to transmit and receive the communication establishing information to and from the data transfer device. The external device is configured to maintain establishment of communication with the data transfer device in a case that a predetermined standby time has not elapsed since a latest reception time point that is a latest time point of reception of the communication maintaining information from the data transfer device, whereas cancel the establishment of the communication with the data transfer device in a case that the standby time has elapsed since the latest reception time point.

In this case, it is preferred that: the communication maintenance processor includes a transmission instruction information storing part configured to store transmission instruction information, which includes the communication maintaining information and communication port specification information for specifying the communication port used for transmitting the communication maintaining information; and the communication maintenance processor is configured to transmit the communication maintaining information included in the stored transmission instruction information to the external device via the communication port specified by the communication port specification information included in the transmission instruction information.

In this case, it is preferred that the transmission instruction information storing part is configured to store the transmission instruction information for each of the plurality of communication ports.

In this case, it is preferred that: the transmission instruction information includes transmission period information representing the transmission period; and the communication maintenance processor is configured to transmit the communication maintaining information every time the transmission period represented by the transmission period information included in the stored transmission instruction information elapses.

Further, a data transfer method of another exemplary embodiment of the present invention is a method including: transmitting and receiving communication establishing information for establishing communication with an external device connected via a communication port to and from the external device, by a communication establishment processor; transmitting communication maintaining information for maintaining establishment of communication with the external device to the external device every time a predetermined transmission period elapses, by a communication maintenance processor configured to operate independently of the communication establishment processor; and, in a state that communication with each of a plurality of external devices via a plurality of communication ports is established, transmitting data received from one of the plurality of external devices to the other one of the plurality of external devices.

In this case, it is preferred that the data transfer method includes: causing a transmission instruction information storing part included in the communication maintenance processor to store transmission instruction information, which includes the communication maintaining information and communication port specification information for specifying the communication port used for transmitting the communication maintaining information; and transmitting the communication maintaining information included in the stored transmission instruction information to the external device via the communication port specified by the communication port specification information included in the transmission instruction information.

In this case, it is preferred that the data transfer method includes causing the transmission instruction information storing part to store the transmission instruction information for each of the plurality of communication ports.

In this case, it is preferred that: the transmission instruction information includes transmission period information representing the transmission period; and the data transfer method includes transmitting the communication maintaining information every time the transmission period represented by the transmission period information included in the stored transmission instruction information elapses, by the communication maintenance processor.

Further, a communication maintenance processing program of another exemplary embodiment of the present invention is a computer program for causing a processing device to realize a communication maintenance processing means. The processing device is configured to operate independently of a communication establishment processor in a case that the communication maintenance processing program is applied to a data transfer device. The data transfer device is equipped with a plurality of communication ports and the communication establishment processor that is configured to transmit and receive communication establishing information for establishing communication with an external device connected via the communication port to and from the external device, and is configured to, in a state that communication with each of a plurality of external devices via the plurality of communication ports is established, transmit data received from one of the plurality of external devices to the other one of the plurality of external devices. The communication maintenance processing means is configured to transmit communication maintaining information for maintaining establishment of communication with the external device to the external device every time a predetermined transmission period elapses.

In this case, it is preferred that the communication maintenance processing means is configured to transmit the communication maintaining information included in transmission instruction information stored in a transmission instruction information storing part included in the data transfer device, to the external device via a communication port specified by communication port specification information included in the transmission instruction information.

In this case, it is preferred that the transmission instruction information storing part is configured to store the transmission instruction information for each of the plurality of communication ports.

In this case, it is preferred that: the transmission instruction information includes transmission period information representing the transmission period; and the communication maintenance processing means is configured to transmit the communication maintaining information every time the transmission period represented by the transmission period information included in the stored transmission instruction information.

Inventions of a communication maintenance processing circuit, a data transfer system, a data transfer method or a communication maintenance processing program having the abovementioned configurations have like actions as the abovementioned data transfer device, and therefore, can achieve the object of the present invention mentioned above.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

For example, the communication maintenance processor is configured by the communication maintenance processing circuit 10 in the abovementioned exemplary embodiments, but may be configured by a processing device and a program executed by the processing device. Moreover, in this case, the program may be stored in a storing device, or may be stored in a recording medium that can be read by a computer. For example, the recording medium is a portable recording medium such as a flexible disk, an optical disk, a magneto-optical disk, and a semiconductor memory.

Further, the external device is an L2SW in the abovementioned exemplary embodiment, but may be another device (e.g., a server device, etc.).

Further, as a modified example of the abovementioned exemplary embodiments, any combination of the abovementioned exemplary embodiments and modified examples may be employed.

The present invention can be applied to a data transfer system connected with a plurality of layer 2 switches executing link aggregation, and so on.

The invention claimed is:

1. A data transfer device comprising:
a plurality of communication ports;
a communication establishment processor configured to transmit and receive communication establishing information for establishing communication with each external device of a plurality of external devices connected via a corresponding communication port of the plurality of communication ports to and from each external device; and
a communication maintenance processor configured to operate independently of the communication establishment processor, and transmit communication maintaining information for maintaining establishment of the communication with each external device, to each external device, every time a predetermined transmission period elapses,
the data transfer device being configured to, in a state that communication with the plurality of external devices via the plurality of communication ports is established, transmit data received from a first external device of the plurality of external devices to a second external device of the plurality of external devices,
wherein the communication maintenance processor is further configured to, even if an operation of the communication establishment processor has stopped, transmit the communication maintaining information to each external device with which communication has been established.

2. The data transfer device according to claim 1, wherein:
the communication maintenance processor includes a transmission instruction information storing part configured to store transmission instruction information, which includes the communication maintaining information and communication port specification information for specifying the communication port of the plurality of communication ports used for transmitting the communication maintaining information; and
the communication maintenance processor is configured to transmit the communication maintaining information included in the stored transmission instruction information to each external device via the communication port specified by the communication port specification information included in the transmission instruction information.

3. The data transfer device according to claim 2, wherein the transmission instruction information storing part is configured to store the transmission instruction information for each of the plurality of communication ports.

4. The data transfer device according to claim 2, wherein:
the transmission instruction information includes transmission period information representing the predetermined transmission period; and
the communication maintenance processor is configured to transmit the communication maintaining information every time the predetermined transmission period represented by the predetermined transmission period information included in the stored transmission instruction information elapses.

5. The data transfer device according to claim 2, wherein the communication establishment processor is configured to generate the transmission instruction information based on the communication establishing information and cause the transmission instruction information storing part in the communication maintenance processor to store the generated transmission instruction information.

6. The data transfer device according to claim 5, wherein the communication establishment processor is configured to, every time a predetermined transmission instruction update period elapses, generate the transmission instruction information and cause the transmission instruction information storing part in the communication maintenance processor to store the generated transmission instruction information.

7. The data transfer device according to claim 5, wherein the communication establishment processor is configured to monitor the communication processor and, in a case that the communication maintaining information to be transmitted for maintaining the establishment of the communication has changed, generate the transmission instruction information and cause the transmission instruction information storing part to store the generated transmission instruction information.

8. The data transfer device according to claim 2, wherein the communication establishment processor is configured to acquire the transmission instruction information stored in the transmission instruction information storing part when the communication establishment processor starts an operation.

9. The data transfer device according to claim 1 being configured to perform link aggregation, which is transmission and reception of data to and from one external device of the external devices via one of the plurality of communication ports.

10. The data transfer device according to claim 1 being configured to transmit and receive the data in accordance with a protocol of a data link layer in Open Systems Interconnection (OSI) reference model.

11. A data transfer system comprising:
a plurality of external devices; and
a data transfer device comprising:
   a plurality of communication ports;
   a communication establishment processor configured to transmit and receive communication establishing information for establishing communication with each external device connected via a corresponding communication port of the plurality of communication ports, to each external device; and
   a communication maintenance processor configured to operate independently of the communication establishment processor, and transmit communication maintaining information for maintaining establishment of the communication with each external device, to each external device, every time a predetermined transmission period elapses,
the data transfer device being configured to, in a state that communication with the plurality of external devices via the plurality of communication ports is established, transmit data received from a first external device of the plurality of external devices to a second external device of the plurality of external devices,
wherein the communication maintenance processor is further configured to, even if an operation of the communication establishment processor has stopped, transmit the communication maintaining information to each external device with which communication has been established.

12. The data transfer system according to claim 11, wherein:
the communication maintenance processor includes a transmission instruction information storing part configured to store transmission instruction information, which includes the communication maintaining information and communication port specification information for specifying the communication port used for transmitting the communication maintaining information; and
the communication maintenance processor is configured to transmit the communication maintaining information included in the stored transmission instruction information to each external device via the communication port specified by the communication port specification information included in the transmission instruction information.

13. The data transfer system according to claim 12, wherein the transmission instruction information storing part is configured to store the transmission instruction information for each of the plurality of communication ports.

14. The data transfer system according to claim 12, wherein:
the transmission instruction information includes transmission period information representing the predetermined transmission period; and
the communication maintenance processor is configured to transmit the communication maintaining information every time the predetermined transmission period represented by the predetermined transmission period information included in the stored transmission instruction information elapses.

15. A data transfer method comprising:
transmitting and receiving communication establishing information for establishing communication with each external device of a plurality of external devices connected via a corresponding communication port of the plurality of communication ports;
transmitting communication maintaining information for maintaining establishment of communication with each external device to each external device every time a predetermined transmission period elapses, by a communication maintenance processor configured to operate independently of the communication establishment processor; and
in a state that communication with the plurality of external devices via the plurality of communication ports is established, transmitting data received from a first external device of the plurality of external devices to a second external device of the plurality of external devices,
wherein the communication maintenance processor is further configured to, even if an operation of the communication establishment processor has stopped, transmit the communication maintaining information to each external device with which communication has been established.

16. The data transfer method according to claim 15 comprising:
causing a transmission instruction information storing part included in the communication maintenance processor to store transmission instruction information, which includes the communication maintaining information and communication port specification information for specifying the communication port used for transmitting the communication maintaining information; and transmitting the communication maintaining information included in the stored transmission instruction information to each external device via the communication port specified by the communication port specification information included in the transmission instruction information.

17. The data transfer method according to claim 16 comprising:

causing the transmission instruction information storing part to store the transmission instruction information for each of the plurality of communication ports.

18. The data transfer method according to claim 16, wherein the transmission instruction information includes transmission period information representing the predetermined transmission period, the data transfer method comprising:

transmitting the communication maintaining information every time the predetermined transmission period represented by the predetermined transmission period information included in the stored transmission instruction information elapses, by the communication maintenance processor.

19. A non-transitory computer-readable medium storing a communication maintenance processing program for causing a processing device to realize a communication maintenance processing means, the processing device being configured to operate independently of a communication establishment processor in a case that the communication maintenance processing program is applied to a data transfer device, the data transfer device being equipped with a plurality of communication ports and the communication establishment processor that is configured to transmit and receive communication establishing information for establishing communication with each external device of a plurality of external devices connected via a corresponding communication port of the plurality of communication ports to and from each external device, and being configured to, in a state that communication with each of a plurality of external devices via the plurality of communication ports is established, transmit data received from one of the plurality of external devices to the other one of the plurality of external devices, and the communication maintenance processing means being configured to transmit communication maintaining information for maintaining establishment of communication with each external device to each external device every time a predetermined transmission period elapses, wherein the communication maintenance processing means is further configured to, even if an operation of the communication establishment processor has stopped, transmit the communication maintaining information to each external device with which communication has been established.

20. The non-transitory computer-readable medium according to claim 19, wherein the communication maintenance processing means is configured to transmit the communication maintaining information included in transmission instruction information stored in a transmission instruction information storing part included in the data transfer device, to each external device via the communication port specified by communication port specification information included in the transmission instruction information.

21. The non-transitory computer-readable medium according to claim 20, wherein the transmission instruction information storing part is configured to store the transmission instruction information for each of the plurality of communication ports.

22. The non-transitory computer-readable medium according to claim 20, wherein:

the transmission instruction information includes transmission period information representing the predetermined transmission period; and the communication maintenance processing means is configured to transmit the communication maintaining information every time the predetermined transmission period represented by the predetermined transmission period information included in the stored transmission instruction information.

23. A communication maintenance processor executing the communication maintenance processing program stored on the non-transitory computer-readable medium of claim 19.

* * * * *